United States Patent
Yan

(10) Patent No.: US 6,770,864 B2
(45) Date of Patent: Aug. 3, 2004

(54) LIGHT BEAM OPERATED PERSONAL INTERFACES TO COMPUTERS

(76) Inventor: Yong Yan, 450 N. Mathilda Ave. #C307, Sunnyvale, CA (US) 94085

( * ) Notice: Subject to any disclaimer, the term of this patent is extended or adjusted under 35 U.S.C. 154(b) by 310 days.

(21) Appl. No.: 10/026,201

(22) Filed: Dec. 22, 2001

(65) Prior Publication Data

US 2003/0117367 A1 Jun. 26, 2003

(51) Int. Cl.[7] .......................... H01J 40/14; G06F 15/40
(52) U.S. Cl. ....................................... 250/221; 345/168
(58) Field of Search .............................. 250/221, 208.4; 340/407.2, 825.19; 345/156, 158, 168–170

(56) References Cited

U.S. PATENT DOCUMENTS

| | | | | |
|---|---|---|---|---|
| 3,986,030 A | * | 10/1976 | Teltscher | 250/221 |
| 4,713,535 A | * | 12/1987 | Rhoades | 250/221 |
| 5,426,450 A | * | 6/1995 | Drumm | 345/168 |
| 5,686,942 A | * | 11/1997 | Ball | 345/158 |
| 5,689,246 A | * | 11/1997 | Dordick et al. | 340/825.19 |
| 5,883,616 A | * | 3/1999 | Koizumi et al. | 345/156 |
| 5,926,264 A | * | 7/1999 | Beale et al. | 356/152.1 |
| 6,097,373 A | * | 8/2000 | Jakobs | 345/168 |
| 6,292,169 B1 | * | 9/2001 | Numazaki et al. | 345/168 |

FOREIGN PATENT DOCUMENTS

| | | | | |
|---|---|---|---|---|
| DE | | 4114926 C1 | * 9/1992 | A61F/4/00 |
| IT | | WO 0062148 | * 10/2000 | |

* cited by examiner

Primary Examiner—Stephone B. Allen

(57) ABSTRACT

An optical input apparatus includes a light source of a directional light beam and a receiving module. The receiving module contains a collection of photodetectors through which information can be input into a system by pointing the light beam at various photodetectors. The photodetectors can be so arranged that all the functionalities of the standard computer keyboard and mouse can be performed by this apparatus. Such an input interface reduces greatly the factors that may cause repetitive strain injuries and can be used by people having difficulties operating a keyboard and mouse. The most preferred embodiments are for computer mouse and keyboard. Other hand operating devices, such as Personal Digital Assistants and remote controls can all make use of the advantages offered by this apparatus.

8 Claims, 5 Drawing Sheets

LIGHT BEAM OPERATED PERSONAL INTERFACES TO COMPUTERS

CROSS-REFERENCE TO RELATED APPLICATIONS

Not applicable.

BACKGROUND

1. Field of Invention

This invention relates to machine input interface, specifically to an optical method and apparatus for entering information into machines, such as computers.

2. Description of Prior Art

Many types of input devices have been developed to provide some means for entering information into machines, especially computers, data processing and information systems. Typical input devices include keyboard, keypad, mouse, track ball, joystick, Light pen, touch pad, touch screen, pen tablet, data tablet, remote control, etc. However, despite the effort of ergonomic designs and the use of wireless transmission mode for mouse pad and keyboard etc., the number of the cases of computer related Repetitive Strain Injury (RSI) is still increasing at about 700,000 per year in the U.S. When a person is injured of this cause, the use of such input devices is then restricted and the productivity is lowered. In some worst cases, a change of career is pursued.

Anyone who works at a computer is at risk for developing RSI regardless of what type of input devices listed above is used even with conventional improvement, because the factors that predispose someone to injury exist in the usage of all the devices listed above. These factors include:

(1). Repetitive movements and exertion of force from hand and fingers on a hard surface. The force of the movement is a particular factor of RSI. For example, the usage of a keyboard requires repetitive hits on keys using the fingers, which may result in tons of pressures on a finger each day.

(2). Working in a fixed position for a long period of time. This may pinch nerve groups and retard the blood circulation of the body. As all the devices listed above require fixed postures in using them, even the best ergonomically designed devices do not prevent the user from injury of this kind.

(3). Improper postures, such as bending the wrists to the side, are common for most people whose shoulders are wider than the key range. However, the perfect postures for the fingers, wrists, arms, and back require enormous effort to maintain and usually cannot last very long.

(4). Improper workstation configuration strains different areas of the body from neck to wrists. In reality, it is impossible to get a perfectly fit configuration for any specific person.

Besides the injuries that they may cause people, the conventional devices on the market also have following disadvantages:

(1). Devices that contain buttons, keys, or balls which need to be moved by forces from outside of the system usually cannot be sealed or covered. They are often contaminated by dirt and other materials and become malfunctioning.

(2). Buttons and keys usually have size limit as imposed by human hands and fingers. For instance, all character keys cannot be installed at a proper size on a cell phone set. The size of the keyboard is also a limiting factor to prevent the notebook computers from becoming smaller.

SUMMARY

In this invention, the optical machine input interface comprises a light source and a receiving module. The light source emits a narrow and directional beam of photons, such as a laser pointer and can be operated easily by hand. The receiving module comprises a collection of photodetectors with associated amplifiers and a decision circuit. The impact of the light beam on a photodetector generates a corresponding signal that is further processed and transmitted by the circuit to the system. Each entry of a photodetector represents a command or data. Thus, commands and data can be entered into the system by shinning the light beam at different photodetector entries.

In operation, the operator manually operates the light source to point at different photodetectors for entering commands and data. In one embodiment for example, each key on a computer keyboard is replaced by a photodetector entry. The same signal is sent to the computer interface upon the impact of the light beam at a photodetector entry just as the corresponding key is pressed. The operator can hold a laser pointer in hand and point at the photodetector entries one at a time to enter commands and data into the system.

OBJECTS AND ADVANTAGES

It is accordingly an object of this invention to provide an input interface that can be used by people who cannot use a keyboard and a mouse and who are restricted from the use of those for the suffering from RSI. It is also an object to minimize the possibilities of injuries usually caused by working on the prior art. In particular, for the task of data entry, the objects and advantages of this invention are:

(a) to reduce the forceful movement of hands and arms of the operators (b) to free the operators from applying pressure on fingers and wrists (c) to free the operators from the need of maintaining a fixed position and posture (d) to free the operator from the need of staying close to the surface where the electrical signals are generated.

(e) to enable those who are restricted by physical conditions from using the keyboard and mouse to work with computers.

Further objects and advantages are to provide a machine input interface of which the receiving module and the receiving entries can have a much wider range of possible sizes; the circuit can be sealed and free from contamination of outside materials such as dust and fluid; and the moving parts can be separated from the system. Still further objects and advantages will become apparent from a consideration of the ensuing description and drawings.

DESCRIPTION

The purpose of this invention is to let an operator use a light source, such as a laser pointer or a pen style flash light, to point at different photodetector entries as a means to enter commands and data into a computer or any system that takes data or command input. Entering different data can be achieved by changing the direction or position of the light beam. The light source can weigh very little and be attached to any moving part of a human body. The movement of hands, the force and strain experienced by arms and shoulders are reduced greatly in comparison with that of using a keyboard and mouse. Besides, an operator can perform data entry task from a distance with no fixed postures required. Thus, the operator is unleashed from the surface on which the keyboard and mouse are housed and can increase productivity substantially over a long period of time. This productivity gain comes with much reduced muscle and joint tiredness.

The following paragraphs and associated figures describe the structural and operational details of embodiments of such an interface system. It is also shown that all the functions of a typical keyboard and a mouse can be achieved by this optical interface, especially with no muscle straining performing a "drag and drop".

Figure 1:
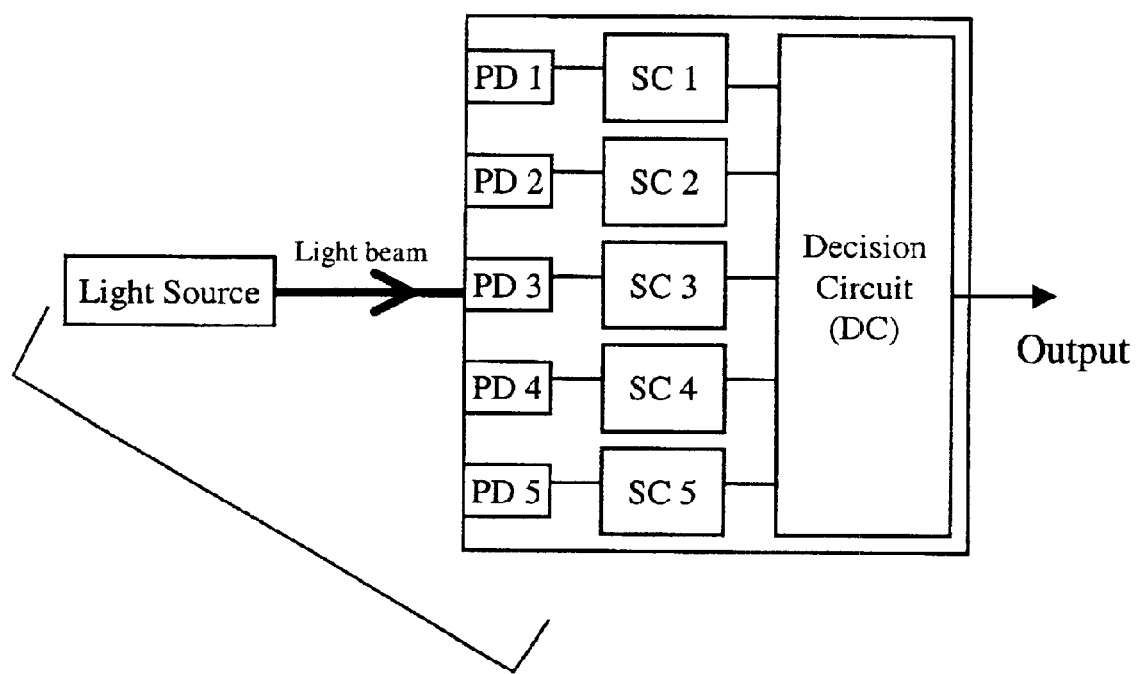
FIG. 1 is a simplified schematic diagram of a basic system with 5 photodetectors.
Figure 2:
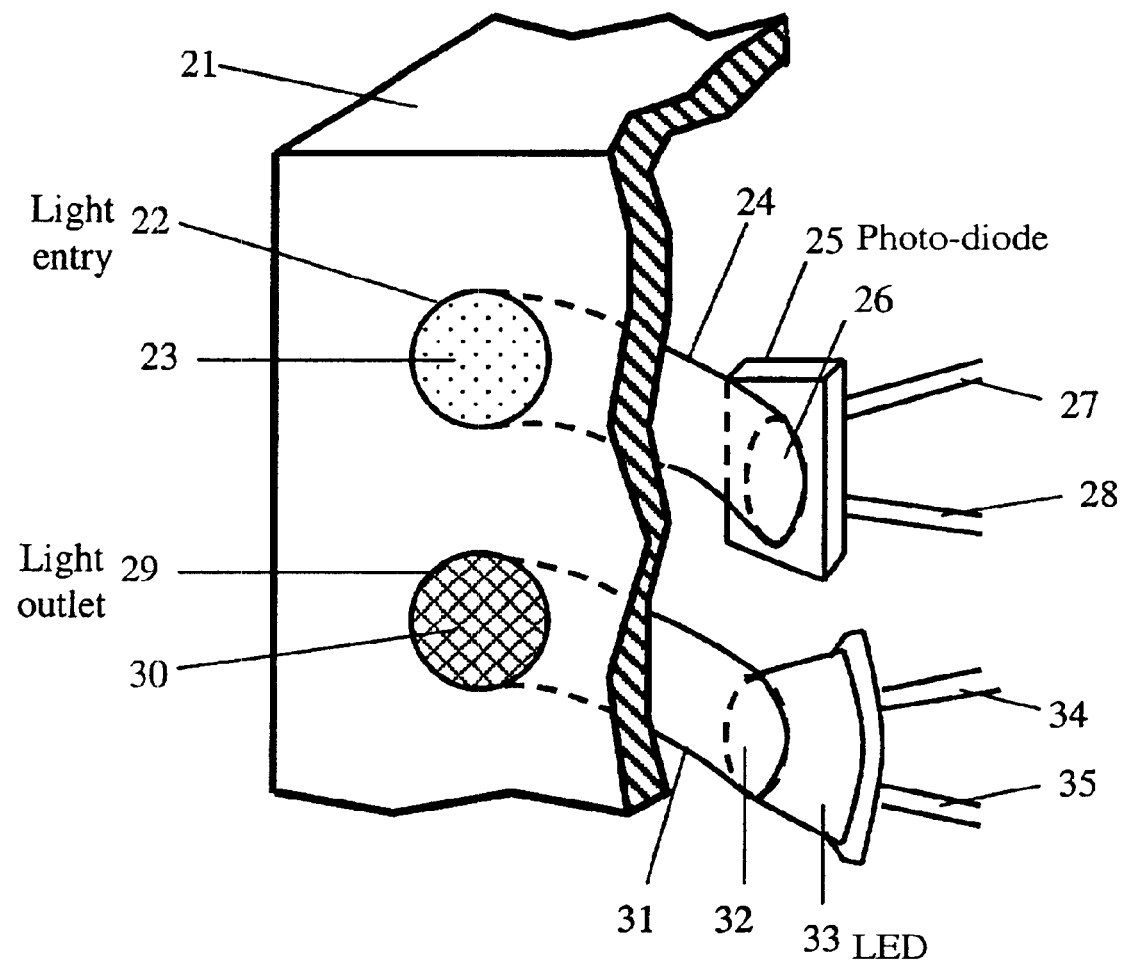
FIG. 2 is a perspective sectional view of a corner of one embodiment in physical form.
Figure 3:
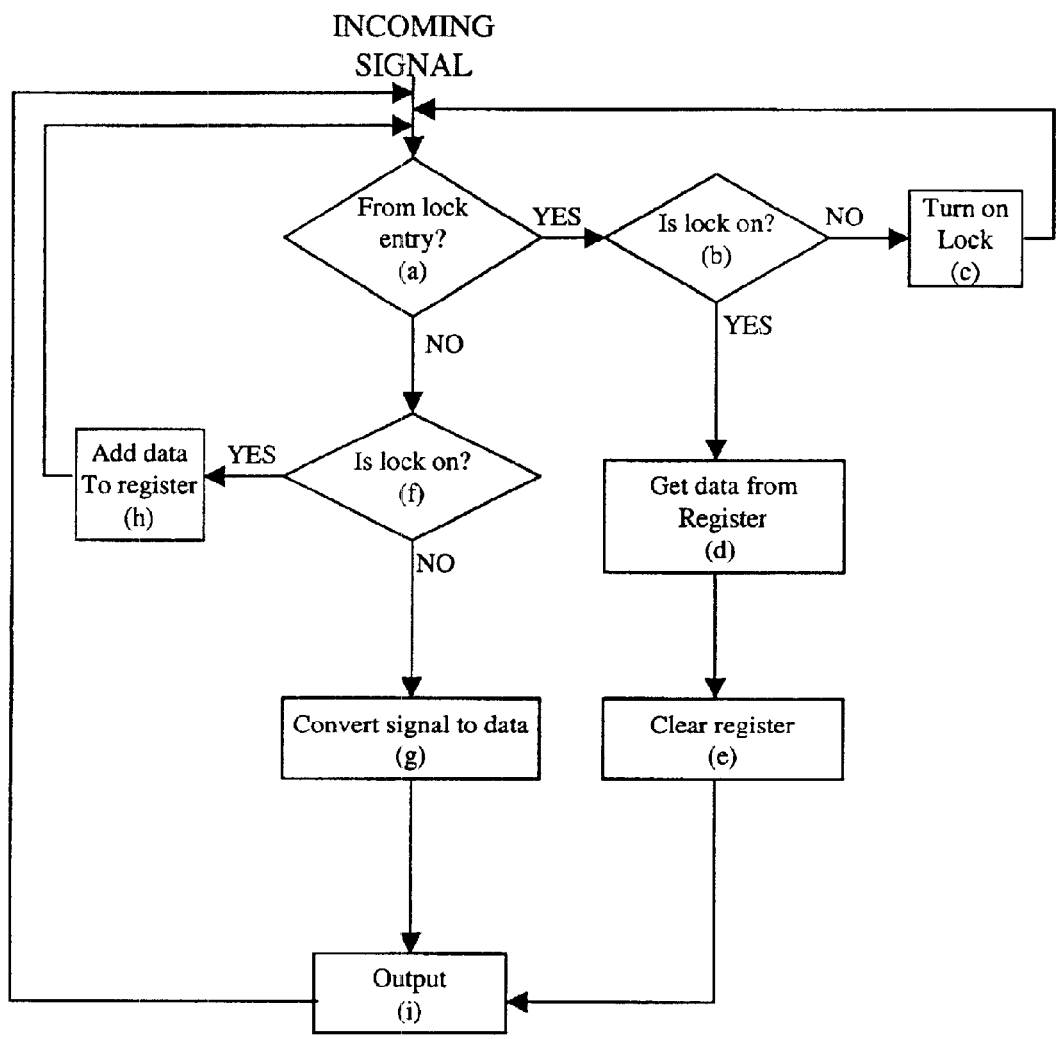
FIG. 3 shows a flow chart of the logic of the locking mechanism.

Basic Components, Structure, and Mechanisms—FIGS. 1, 2, 3

FIG. 1 depicts the basic components and structure of such a system. The Light Source in the diagram can be a laser pointer, a pen style flash light, or any other light sources which can be manipulated by human. The light beam is directional and narrow enough such that when an entry is being shined at, not enough photons may go to the neighboring photodetector entries to generate a signal. PD1, PD2, PD3, PD4, and PD5 are all photodetectors. They can be of different types such as photo-conductors, photo-diodes, photo-transistors, or any other photon sensitive devices, but are all sensitive to the light beam from the Light Source. Upon impact of the light beam, a photodetector generates an electrical signal in the form of a current or voltage change. This signal is amplified and converted by a corresponding Signal Circuit (SC) that is connected to the photodetector. SC1, SC2, SC3, SC4, and SC5 are such signal circuits. Signals from all the SCs are transmitted to a Decision Circuit (DC) that processes all the incoming signals in a predetermined logic and then outputs a result data signal.

A sectional corner and some physical elements of an embodiment are shown in FIG. 2. A container 21 encloses all the electrical elements. Because no part is moving, all the seams on the front surface can be sealed so that dirt is kept out. A hole 22 on the front surface is an entry for a photodetector 25, in this case a photo-diode. This hole 22 is covered by some optical filtering material 23 to reduce the background light. An optical fiber 24 guides the photons from the entry 22 to the receiving area 26 of the photodiode 25 which has legs 27 and 28 to connect to an electric circuit.

A visual feedback mechanism is provided by this example embodiment. A Light Emitting Device (LED) 33 generates a pulsed light signal when an input signal is completed by a Signal Circuit and applies a voltage signal on the legs 34 and 35 of the LED 33. The light pulse coming out from the area 32 of LED 33 is guided by an optical fiber 31 to the outlet 29. The outlet 29 is covered by some illumination material 10 to provide a desired color of light.

A preferred embodiment is a computer input device that is equivalent to a computer keyboard with each key of the keyboard replaced by a photodetector entry. In such an embodiment, the same signal is sent to the computer when a photodetector is receiving the light beam as if the key it replaces is being pressed. However, one advantage of using a keyboard is that multiple keys can be held down simultaneously by fingers. Using a light beam to operate optical switches remotely can also perform multiple input actions simultaneously in the following ways. (1). Using a light beam splitter, or additional light beam sources to direct light beams at multiple photodetectors simultaneously. (2). Introducing a locking mechanism with an additional photodetector to achieve the effect. After the lock is activated by the light beam, all subsequent input signals from other photodetectors are held valid simultaneously until the lock is deactivated.

FIG. 3 shows the logic process of the locking mechanism. The Decision Circuit (DC) processes the locking mechanism with a reserved register. When the DC receives a signal, it first checks in step (a) to see if the signal is from the entry of the lock photodetector. If the signal is from the lock entry, the process proceeds to step (b) and check the register for status. If the register is empty, then a bit is turned on for setting up the lock in step (c). Otherwise in step (b) means the signal is a closing signal, and the process retrieves the data stored in the register in step (d) and clears the register with both the data and locking bit in step (e). At this stage, the lock is turned off. The data is then sent to output in step (i). Then the DC returns to the initial state waiting for next incoming signal.

If at step (a) the signal is not from the locking entry, the DC checks the register to see if the lock has been turned on at step (f). If the lock has been turned on, the signal is supposed to be simultaneously valid with other signals. A corresponding data is then added to the register at step (h) and the process returns to wait for next incoming signal. If the lock is off at step (f), then no locking procedure is invoked and the process converts the signal to desired data format at step (g). After the data is sent to output at step (i), the process returns to the waiting stage.

Figure 4:
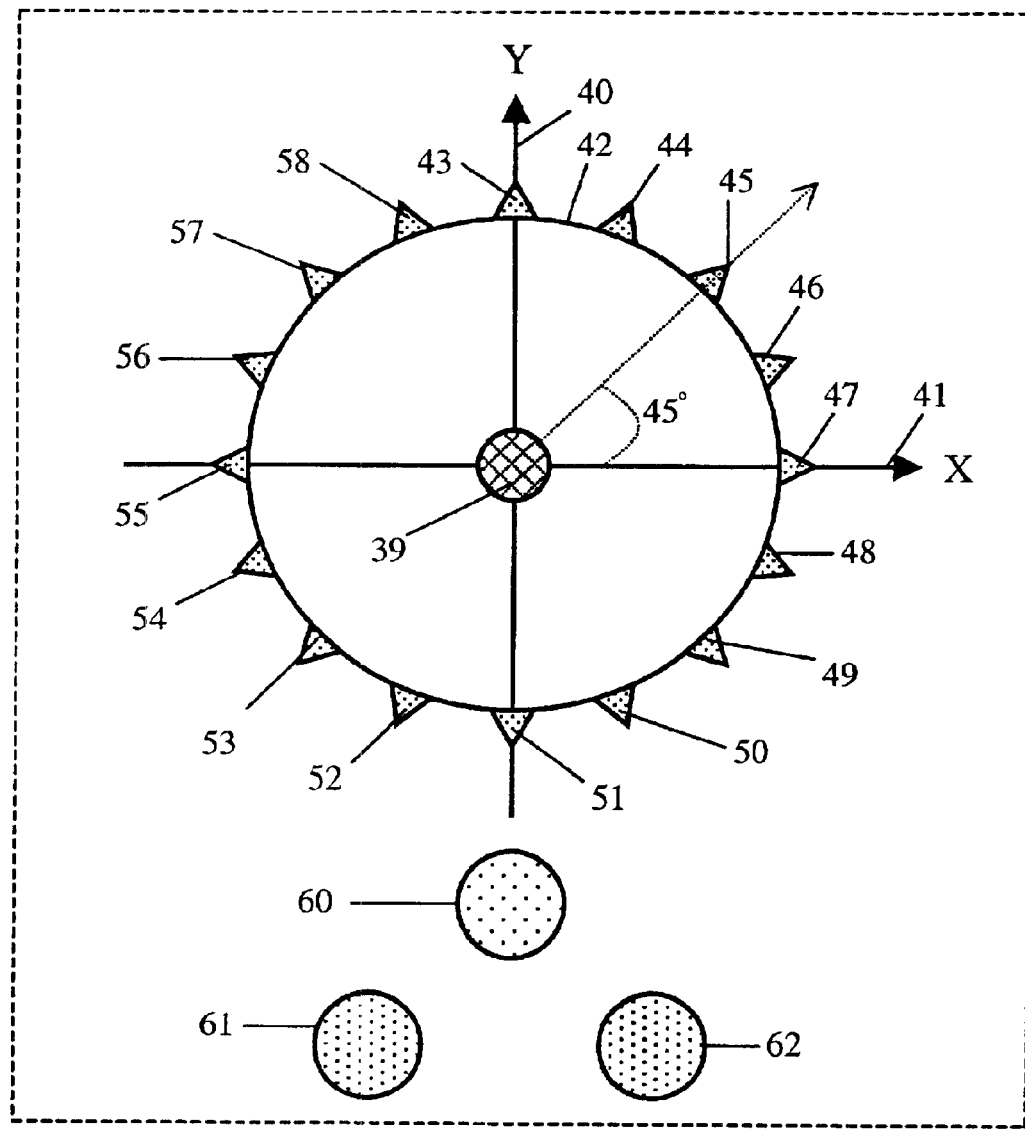
FIG. 4 is an illustration diagram of how the photodetector entries can be arranged geometrically to specify the directional movement for pointing devices.
Figure 5:
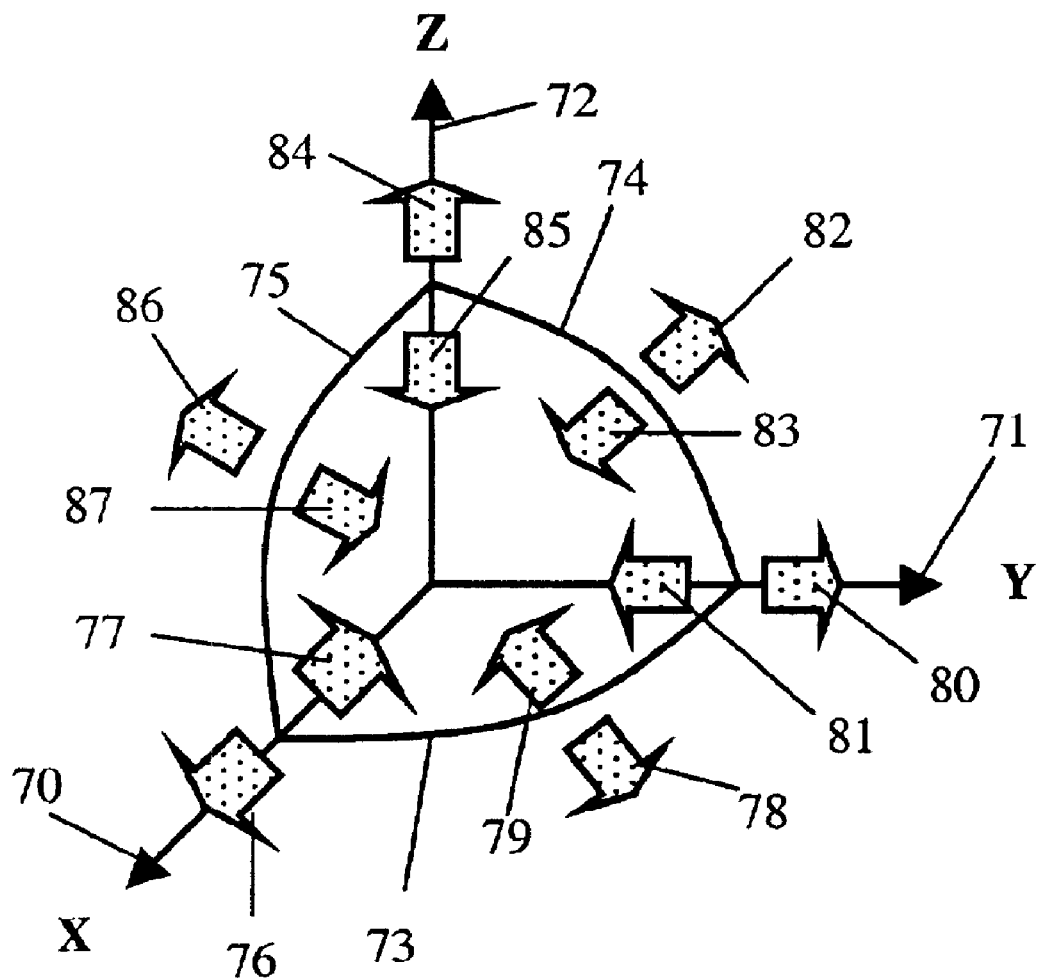
FIG. 5 shows an example of using geometrical arrangement of the photodetector entries and assisting lines for directing the 3-dimentional movement for pointing devices.

Embodiments of Geometric Arrangement—FIGS. 4, 5

Another preferred embodiment of this invention is that the photodetector entries can be arranged in a centrifugal geometry, such as circular, or polygonal in a 2-dimentional surface, spherical or cubical in a 3-dimentional space, to provide directional specifics of the input. FIG. 4 shows an example of such an embodiment of a pointing device that performs all the functions that a mouse does. A number of photodetectors 43–58 are evenly placed along a circle 42. A Cartesian coordinate system is established with the origin point at the center of circle 42, a vertical line 40 representing the Y-axis and a horizontal line 41 representing the X-axis. Each photodetector entry is in a triangular shape pointing outwardly to a direction along which the cursor on a display device can move. The distance that the cursor should move can be determined by the time of the light beam striking on the entry, or the number of photons that the photodetector has received.

For example, entry 45 has the direction with a 45° angle relative to the X-axis. Directing the light beam at this entry indicates the cursor move at this angle in the display device, i.e., with equal number of pixels along the X and Y direction. Assuming a unit time, T seconds are needed for the photodetector to generate a signal indicating 1 pixel of distance to move, 10 T seconds of the light on the entry would move the cursor 7 pixels in the X direction and 7 pixels in the Y direction.

A visual feedback light outlet 39 blinks when an input signal is sent to the system. Photodetector entries 61 and 62 perform the same functions as the two buttons of a mouse. An additional entry 60 is introduced as the locking entry. It can be used here to perform the function of "drag and drop". Turning a lock on by shinning on entry 60. Shinning on entry 61 subsequently means the left mouse button is being held down. The cursor can move then by pointing the light beam at the circularly placed photodetector entries. This performs a "dragging" action. Turning the lock off by shinning on entry 60 again, which means to release the button and "drop".

FIG. 5 is an illustration of an arrangement of the photodetector entries for directional indications for 3-dimensional movement. Here a 3-dimensional perpendicular coordinate system is established with the origin representing the current position of the cursor. X-axis is represented by arrow line 70, Y-axis 71, Z-axis 72. Auxiliary line 73 hints the X-Y plane, line 74 the Y-Z plane, line 75 the Z-X plane. The arrow shaped photodetector entries indicate the directions they point to in each plane and axis. Entry 76 points to the positive direction of X-axis. Entry 77 points to the negative direction of X-axis. Entry 78 points to the 45° in the X-Y plane. Entry 79 points to the opposite direction of that of entry 78 also in the X-Y plane. Entry 80 points to the positive direction of Y-axis. Entry 81 points to the negative direction of Y-axis. Entry 82 points to the 45° in the Y-Z plane. Entry 83 points to the opposite direction of that by entry 82. Entry 84 points to the positive direction of the Z-axis. Entry 85 points to the negative direction of the Z-axis. Entry 86 points to the 45° in the Z-X plane. Entry 87 points to the opposite direction of the by entry 86. By selecting intuitively arranged entries, any point in a 3-dimensional space can be reached easily by shining the light beam on these entries.

One advantage of these embodiments over the mouse is that a directional movement can be performed more precisely due to the clearly marked static directional paths. In using a mouse, mechanical errors of hand movement make it difficult for the cursor to reach a specific point on screen. Besides, it is very difficult, if possible, to perform a 3-dimensional movement intuitively with a mouse or trackball.

CONCLUSION, RAMIFICATIONS, AND SCOPE

From the above description, the reader can see that this optical input interface is capable of performing all the functionalities that conventional mechanical devices can, but with much reduced movement and forces applied to the hands and fingers of the users. The light source can be very easy to operate. If a heavier light source is needed, it can be supported by a stand for the user to change its beam direction using hands or fingers. The user can also move around or take any comfortable posture as long as the target photodetector entries are discernible and within the effective range of the light beam, which can be hundreds of yards for a good laser pointer.

The intensity and the diagonal of the beam determine the receiving area needed for a photodetector. The receiving area usually can be as small as a few millimeters in diameter. Thus it may be possible to install enough character and number input units on the size suitable for a hand-held device such as a cell phone. In addition, the advantages of remote operation and seamless container make it possible to make water-proof TV remote controls and calculators, etc.

While the above description contains much specificity, these should not be construed as limitations on the scope of the invention, but rather as exemplifications of several preferred embodiments thereof. Many other variations are possible. For example, the light source can be controlled by a machine for distant communications to another machine, and the geometric arrangement of the entries can have many variations.

Accordingly, the scope of the invention should be determined not by the embodiments illustrated, but by the appended claims and their legal equivalents.

What is claimed is:

1. A manual method for entering information into a computer, comprising:
   (a) providing a narrow and collimated directional light beam from a source operated by hand,
   (b) providing a receiver which comprises a collection of photodetectors,
   (c) providing a means for generating a corresponding signal upon incident of said light beam on a said photodetector,
   (d) providing a means for directing said light beam by hand selectively at said photodetectors to generate said signals in desired sequence,
   (e) providing a means for processing said signals and transmit the result to said computer without any pre-determined delay in time or any extra devices for selection of said signal, whereby desired information can be generated and entered into said computer,
   (f) providing a means that with a specific photodetector as a lock switch, and an operation logic to achieve the effect of the simultaneous validity of the signals from more than one said photodetectors in any number.

2. The method of claim 1 wherein said receiver contains means for enclosing said photodetectors and said circuitry to prevent contamination from outside materials such as dust and fluid to enter the system without blocking said light beam entering the receiving ends of said photodetectors.

3. An apparatus for entering information into a computer manually, comprising:
   (a) a manually operated light source which generates a narrow and collimated directional light beam,
   (b) an optical receiver which comprises a collection of photodetectors each of which is associated with a circuit that can generate a signal upon impact of said light beam,
   (c) a means for directing said light beam by hand selectively at said photodetectors to generate said signals in desired sequence,
   (d) a circuit that collects and processes said signals and transmit the result to said computer without any pre-determined time delay or any extra switches for selection of said signal,
   (g) a dedicated photodector that serves as a lock switch and an operation logic for achieving the effect of simultaneous validity of the signals from more than one said photodetectors in any number.

4. The apparatus of claim 3 wherein said receiver further including a container which can prevent the contamination of materials such as dust and fluid from outside to enter the system without blocking said light beam entering the receiving ends of said photodetectors.

5. The apparatus of claim 3 wherein said photodetectors are configured in a centrifugal geometry to serve as a pointing device which provides means for determining the direction and distance of a desired movement of a cursor on a display device.

6. A manual method for determining the direction and distance of a desired movement of a cursor on a display device of a computer, comprising:

(a) providing a narrow and collimated directional light beam from a source operated by hand, (b) providing a receiver which comprises a collection of photodetectors that are arranged centrifugally in geometry, (c) providing a means for generating a corresponding signal upon incident of said light beam on a said photodetector, (d) providing a means for directing said light beam by hand selectively at said photodetectors to generate said signals in desired sequence, (e) providing a means for processing said signals resulted from said light beam hitting upon said photodetectors and convert said signals into information of the direction and distance of a desired movement of said cursor on said display device, (f) providing a means for transmitting said information of said desired movement to said computer without any predetermined delay in time or any extra mechanism for selection of said signal.

7. The method of claim 6 wherein a means is provided with a specific photodetector serves as a lock switch and an operation logic to determine the simultaneous validity of the signals from more than one said photodetectors in any number.

8. The method of claim 6 wherein said receiver further including a container which can prevent the contamination of materials such as dust and fluid from outside to enter the system without blocking said light beam entering the receiving ends of said photodetectors.

* * * * *